Patented June 4, 1929.

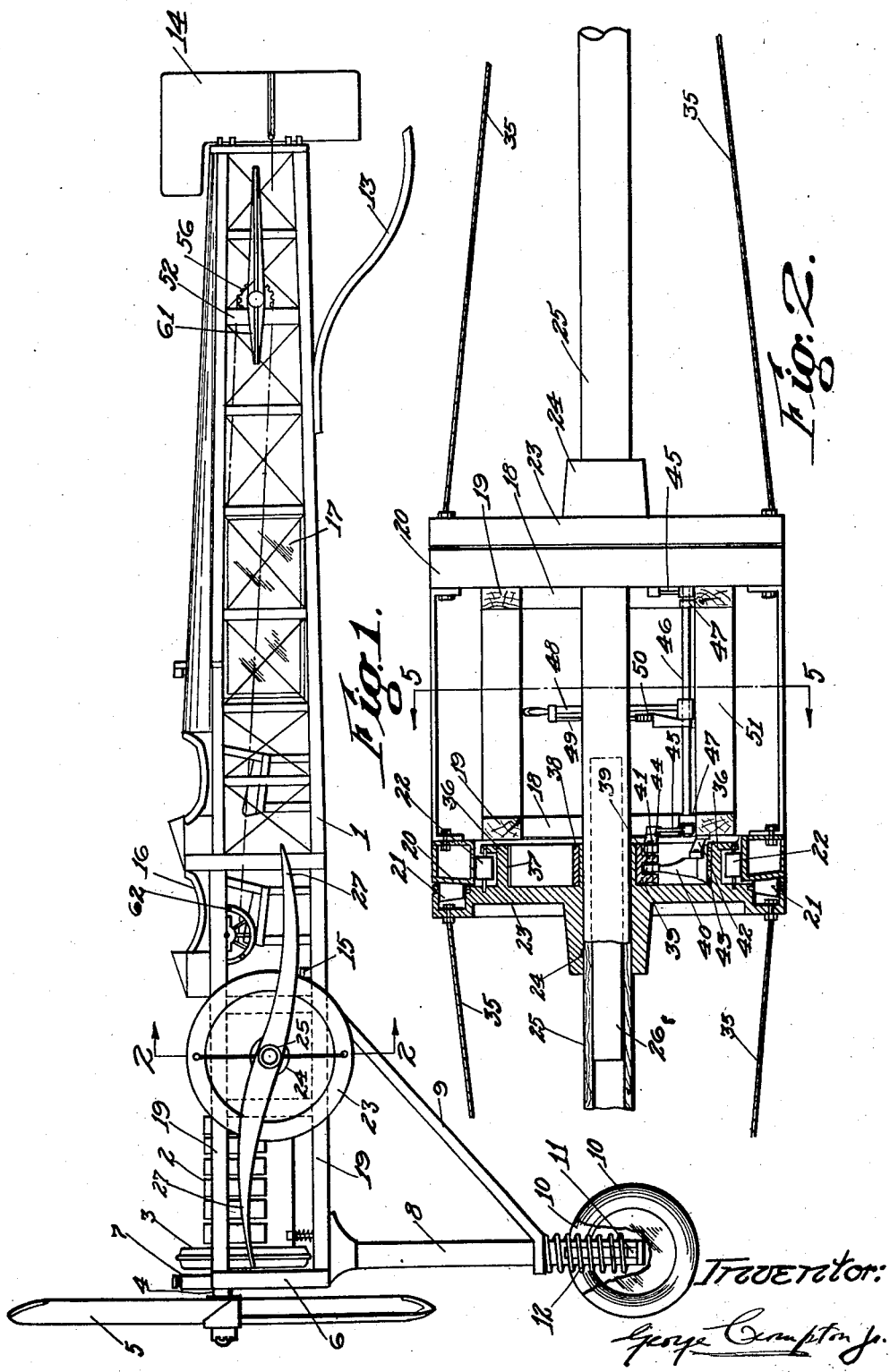

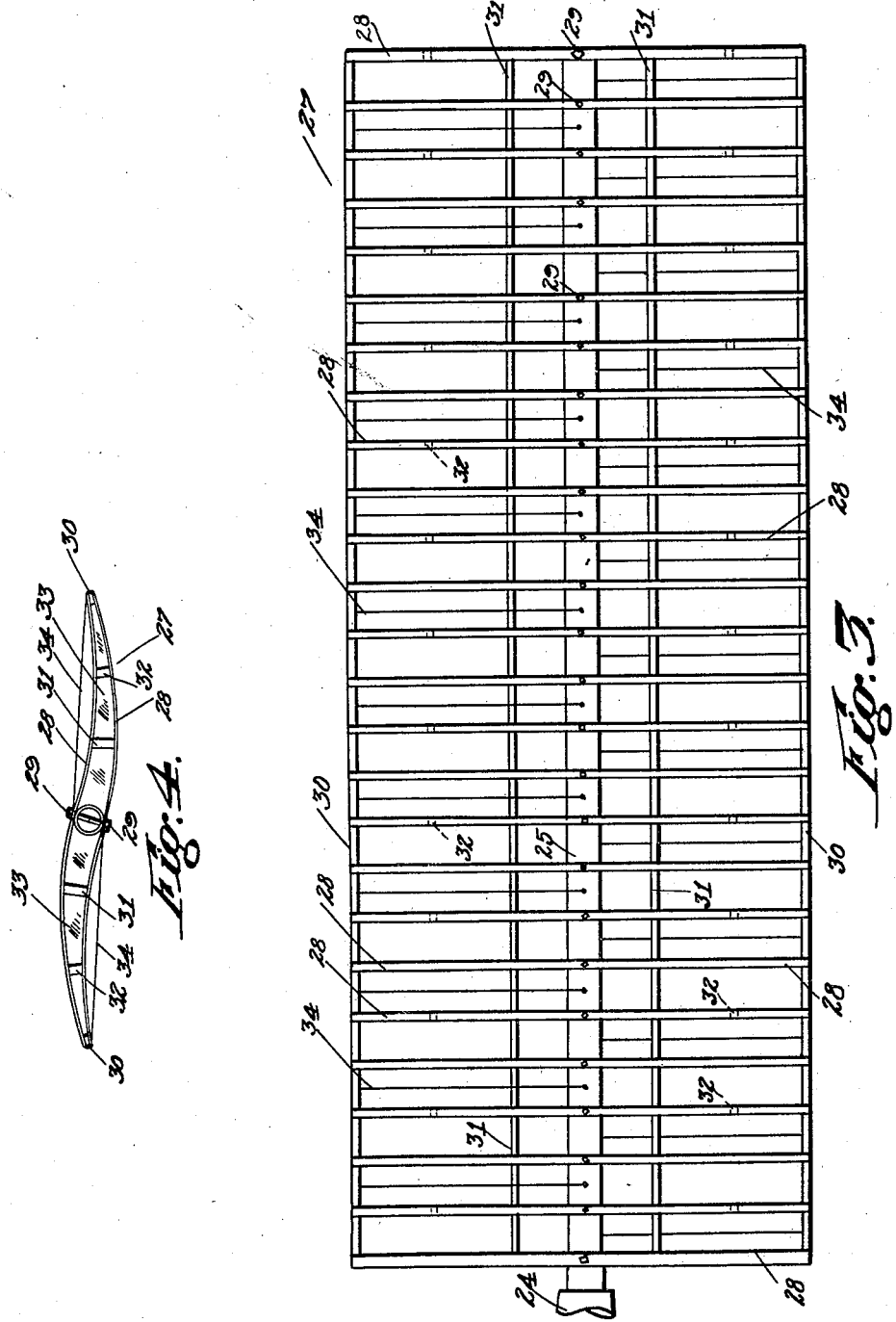

1,716,116

UNITED STATES PATENT OFFICE.

GEORGE CROMPTON, JR., OF WORCESTER, MASSACHUSETTS.

AEROPLANE.

Application filed September 29, 1926. Serial No. 138,439.

The invention relates to aeroplanes, including flying boats and sea planes as well as machines which rise from the land or a ship. In taking off and flying from point to point, the operation of the machine of my invention does not differ from those well known to the art. In landing, however, the aeroplane of my invention operates according to a novel principle. The main supporting wings rotate on their longitudinal axes which lets the aeroplane down gently enough to make possible a good landing, but under such conditions the gliding ratio, instead of being about six to one as is commonly the case, is one to one, or less than one to one. This makes it possible for a machine built in accordance with the present invention to land in a very much smaller cleared area than has been hitherto possible. The advantages of the above will be obvious to all skilled in this art, since it is well known that a large percentage of accidents have occurred because of the difficulty of finding a suitable landing place in an emergency. The aeroplane can also glide, or even land, in the usual manner, so that none of the advantages of the long gliding ratio are lost. For example, in case the engine stops and the pilot sees a small field a mile off, the plane then being at about one thousand feet elevation, he can reach said field in the ordinary manner of gliding, and when almost over it land in the herein described novel manner.

In the drawings—

Fig. 1 is a side elevation of an aeroplane constructed in accordance with my invention, the fuselage being shown stripped and the engine hood being removed, in order to show the structure.

Fig. 2 is an enlarged sectional view on the line 2—2 of Fig. 1, omitting the wing structure.

Fig. 3 is a plan view of a wing before covering.

Fig. 4 is an end view of a wing.

Like reference characters refer to like parts in the different figures.

Figure 6:
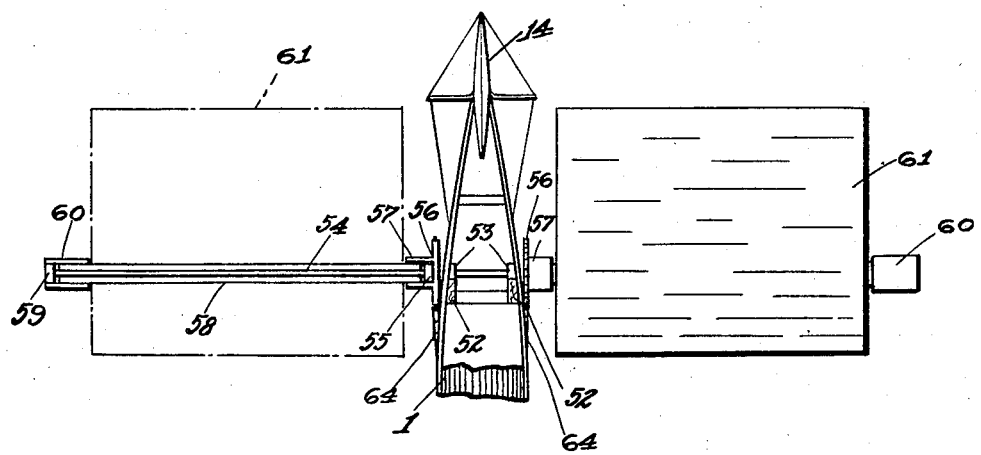
Fig. 6 is a fragmentary plan view of the tail of the aeroplane.

Referring first to Fig. 1, the plane preferably has a fuselage 1 of a common type, in the front part of which is mounted an engine 2. I prefer to employ a high speed engine with reduction gearing 3, as this, besides being dynamically efficient, places the axis of the propeller shaft 4 above the center line of the fuselage 1, which is desirable, as will hereinafter appear.

On the propeller shaft 4 is the usual propeller or screw 5. Just behind the latter, and between the front stanchions 6 of the fuselage, is mounted the usual cooling radiator 7.

The running and landing gear comprises the usual vertical struts 8 and braces 9 which support a pair of wheels 10, 10 on an axle 11, a shock absorbing device 12 being desirably placed between the axle 11 and struts 8. The landing gear is completed by the usual tail skid 13.

Figure 5:
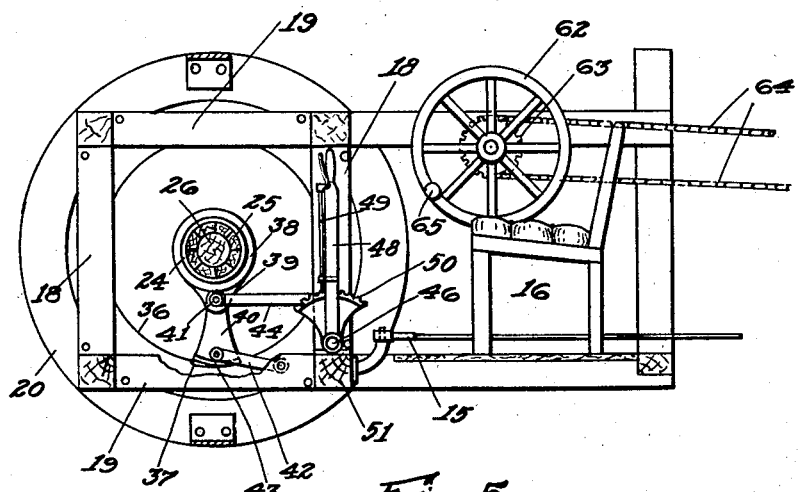
Fig. 5 is a sectional view on the line 5—5 of Fig. 2, showing certain control mechanism, and the interior of the pilot's cockpit.

Referring to Figs. 1, 5 and 6, the plane is steered laterally by the usual balanced vertical rudder 14, actuated by a foot rudder bar 15 from the pilot's cockpit 16. I prefer to locate the gasolene tank 17 aft of the cockpit, as shown, in order that the center of gravity may not be located too far forward.

The structure so far set forth is all well known but I have described and illustrated it in order to disclose the best manner now known to me of putting my invention into practice.

Referring now to Figs. 1, 2 and 5, the front part of the fuselage 1 provides a pair of heavy stanchions 18 on each side thereof, and to these and the four forward longitudinals 19 are fastened a pair of annular members 20, 20, preferably hollow, as shown. The members 20, 20 act as bearing supports for the rotatable wing structure. In contact with the members 20, 20 are a plurality of end thrust rollers 21, and a plurality of radial thrust rollers 22, both sets being carried by large discs 23, 23. The latter have hub portions 24, 24, through which extends a hollow shaft 25, preferably made of laminated wood. For assemblage purposes the shaft 25 is best made in two parts; a central piece 26, and the hub 24 of one disc 23 making the structure practically integral.

Any suitable means, not indicated, may be employed to hold the discs 23, 23 firmly in place on the hollow shaft, and it will be readily seen that when the parts are thus assembled, the shaft 25 is rotatably mounted in the fuselage 1, being firmly supported against either endwise or radial displacement by roller bearings.

The aeroplane is of the monoplane type—structurally speaking, however, there is a right wing and a left wing. Said wings 27 are exactly similar and are built on the hollow shaft 25, their construction being illustrated by Figs. 3 and 4. A plurality of wooden strips 28 are laid flatwise on either side of the shaft 25 and fastened thereto by bolts 29. At the edges of the wings are strips 30, 30 and longitudinals 31, 31 are provided to give rigidity to the wings. Small individual braces 32 may be provided for alternate strips 28, while the balance of the strips 28 have ribs 33 extending therebetween, to give shape to the wings. Said shape is shown by Fig. 4, and it will be noticed that the wings are symmetrical, i. e. the leading and rear edges can be reversed. Brace wires 34 are desirably provided for the wings to enable them to keep this shape, while to hold the wing pressure, brace wires 35 are provided, running from the ends of the shaft 25 to the discs 23.

In order to hold the wings rigid for normal flight a lock and brake mechanism is provided. Referring to Figs. 2 and 5, the discs 23 provide brake drum portions 36 in each of which are a pair of depressions 37, 37, 180 degrees apart. The inwardly extending sides of the hubs 24 provide bearing surfaces for a pair of collars 38, which have forked portions 39 on one side. Brake members 40 are pivotally connected to the collars 38 at the forked portions 39 by pins 41. Links 42 are pivotally attached to the brake members 40 close to the brake shoes 43; said links are also pivotally attached to the bottom longitudinals 19. Links 44 are pivotally received by the pins 41 and at the other end are pivotally connected to levers 45, 45. The latter are keyed to a cross shaft 46, mounted in bearings 47, 47 on the bottom longitudinals 19. Likewise keyed to said cross shaft 46 is a hand lever 48. The hand lever 48 provides a grip operated rod 49 with a dagger on the lower end cooperating with a slotted segment 50 fastened to a cross piece 51 extending between the longitudinals 19. This enables the lever 48 to be held at any desired position.

The aeroplane of the invention desirably has no ailerons on the wings 27—instead the aileron system is incorporated in the elevating rudder control. That is to say, there are two horizontal rudders, independently operable, to change the angle of flight in a vertical plane, and at the same time to balance the aeroplane laterally.

Referring to Figs. 1, 5 and 6, the tail of the fuselage 1 provides a pair of stanchions 52, 52, rather thicker than the average, to which is fastened, by brackets 53, 53, a horizontal shaft 54. On said shaft 54, outside the fuselage 1 are collars 55, firmly fastened. Sprockets 56 with hubs 57 surround said shaft and collars; the hubs 57 being fastened to tubular shafts 58 which surround the shaft 54 on either side of the fuselage. The ends of the shaft 54 have bearing collars 59 attached thereto, while the outer ends of shafts 58 provide cylindrical members 60, 60 for cooperation therewith. Desirably the shaft 54 is a hollow steel shaft, while the shafts 58 are constructed like the shaft 25.

Around the shafts 58 are built tail planes 61, 61, the construction of which need not be particularly described, since they may be constructed according to the ordinary manner of constructing rudder planes of this character. It will be noted, however, that the planes 61, 61 are in aerodynamic balance, and serve as stabilizing fins, as horizontal rudders, and as ailerons. In order to assemble their supporting structure above described, any suitable expedient may be adopted, e. g. by making one or both of the sprockets and hubs 56, 57 in two parts.

In the pilot's cockpit 16 are a pair of hand wheels 62 on either side of the seat. Connected to said hand wheels are sprockets 63. Sprocket chains 64 run from the sprockets 63 to sprockets 56, and thus by operation of the hand wheels 62 the pilot may control the planes 61, 61 individually, and hold either one at any desired angle. The aeroplane operates as follows:—

Taxiing to position, it takes off in the usual manner. In taking off and flying through the air, the pilot steers right and left by means of the foot operated rudder bar 15; up and down by moving the hand wheels 62 in unison; and maintains balance on line flight or banks for a turn by differential actuation of the hand wheels 62. Desirably handles 65 are provided on said hand wheels for more convenient operation. When, being almost over a suitable landing place, the pilot wishes to make a landing according to the novel principle of the invention, the hand lever 48 is moved to raise the brake shoes 43 out of the depressions 37 in which they rest and away from the inner periphery of the drums 36. This frees the discs 23, 23 and makes the wings 27 freely revoluble on the axis of shaft 25. Thereupon they do revolve (clockwise Fig. 1) because the center of pressure of a plane is always forward of the center line. And the couple tending to revolve the wings 27 is increased by the shape adopted for them, as shown in Figs. 1 and 4. Notwithstanding which, it will be noted that said shape does not differ radically from that selected by theory and experiment, as the best cross sectional shape for a supporting plane.

The revolution of the wings 27 tends to stabilize the aeroplane and to let it down gently enough to make a good landing. The forward velocity is greatly reduced, however, as soon as the wings begin to revolve.

The center of gravity, as already mentioned, should not be too far forward, in fact it should be behind the shaft 25. For with the lessening of the forward velocity, the horizontal rudder planes 61 have less power to check an upward movement of the tail of the plane, but if the tail is naturally heavy, the planes 61 can easily be used to overcome any downward movement of the tail, since the angle of descent is very steep. When descending in this manner, without power, planes 61 will be placed by the pilot at a very sharp up elevator position i. e. with the leading edge pointed sharply downwards, otherwise the lifting effect on the broad surface of planes 61 would cause the aeroplane to nose down and crash. It is for this reason that I prefer not to employ a separate stabilizing fin.

Should the pilot change his mind about landing and wish to resume flight for any reason, he will seize the hand lever 48 and place it in the vertical position of Fig. 5 again. It should be noted that the brake shoes 43 first engage the drums 36, and not until the wings 27 have practically stopped do the shoes enter the depressions 37 and positively lock the wings in position. This, of course, is to prevent undue strain on the structure. The brake members 40 and collars 38 act mechanically as a toggle joint, and so exert great power.

A power landing can readily be made with the wings 27 revolving, and from the position of the propeller 5 and the blast therefrom the wings 27 will revolve more rapidly. At the same time the forward speed, while greater than when making a landing without power, will not be nearly as great as the ordinary gliding speed and the stability of the aeroplane will be enhanced by the increased speed of revolution of the wings 27, while the blast from the propeller will enable the planes 61 and rudder 14 to more readily control the machine.

Having thus described the aeroplane of my invention, it must be understood that the constructional details have been given only by way of illustration, and can be varied. In the following claims I use the word "plane", without qualification, as it is used in this art, i. e. to refer to a single pair of wings. It will be understood that the wings 27 may be made independently revoluble, although I prefer the construction set forth.

I claim:

1. In an aeroplane, a fuselage, a horizontal shaft extending through said fuselage at right angles thereto, a pair of discs, one on either side of said fuselage, said shaft extending through said discs, bearing supports to rotatably hold said discs to said fuselage, a pair of wings one on either side of said fuselage and supported from said shaft and said discs, thereby forming a rotatable plane structure securely held to said fuselage, brake drums provided by said discs, depressions in said brake drums, brake shoes adapted to be urged against said brake drums, and means to actuate said brake shoes whereby said rotatable plane structure can be positively locked in position or released to allow it to rotate, and can be brought to a gradual stop without undue shock.

2. In an aeroplane, the combination with a fuselage and a main plane freely rotatable on a transverse axis, of brake means for controlling the rotation of said main plane, and lateral and longitudinal stabilizing means at the rear of the fuselage to stabilize the aeroplane in normal flight with the main plane held stationary by said brake means and in descent with the main plane free to rotate.

3. In an aeroplane, the combination with a fuselage and a main plane freely rotatable on a transverse axis, of brake means for controlling the rotation of said main plane, and a divided rudder the parts of which may be operated separately or in unison in the same or oposite directions in order to stabilize the aeroplane laterally and longitudinally while in normal flight with the main plane held stationary by said brake means and in descent with the main plane free to rotate.

4. In an aeroplane, the combination with a fuselage and a main plane freely rotatable on a transverse axis, of lock and brake means for controlling the rotation of said main plane, and rudder means to stabilize the aeroplane in normal flight and in descent with the main plane unlocked.

5. In an aeroplane, a fuselage, a horizontal shaft extending through said fuselage at right angles thereto, a pair of discs one on either side of said fuselage, said shaft extending through said discs, bearing supports to rotatably hold said discs to said fuselage, a pair of wings one on either side of said fuselage and supported from said shaft and said discs, thereby forming a rotatable plane structure securely held to said fuselage, brake drums provided by said discs, brake shoes adapted to be urged against said brake drums, means to actuate said brake shoes, and recessed locking means whereby said rotatable plane structure can be positively locked in position or released to allow it to rotate, and can be brought to a gradual stop without undue shock.

6. In an aeroplane, the combination with a fuselage and a main plane freely rotatable on a transverse axis, of brake means for controlling the rotation of said main plane, a driving propeller for said aeroplane located at the front thereof and having an axis of rotation above the transverse axis of the plane aforesaid in order to speed the rotation of the plane when the brake is released, and rudder means to stabilize the aeroplane in normal flight and in descent with the main plane unlocked.

GEORGE CROMPTON, Jr.